Patented Dec. 1, 1931

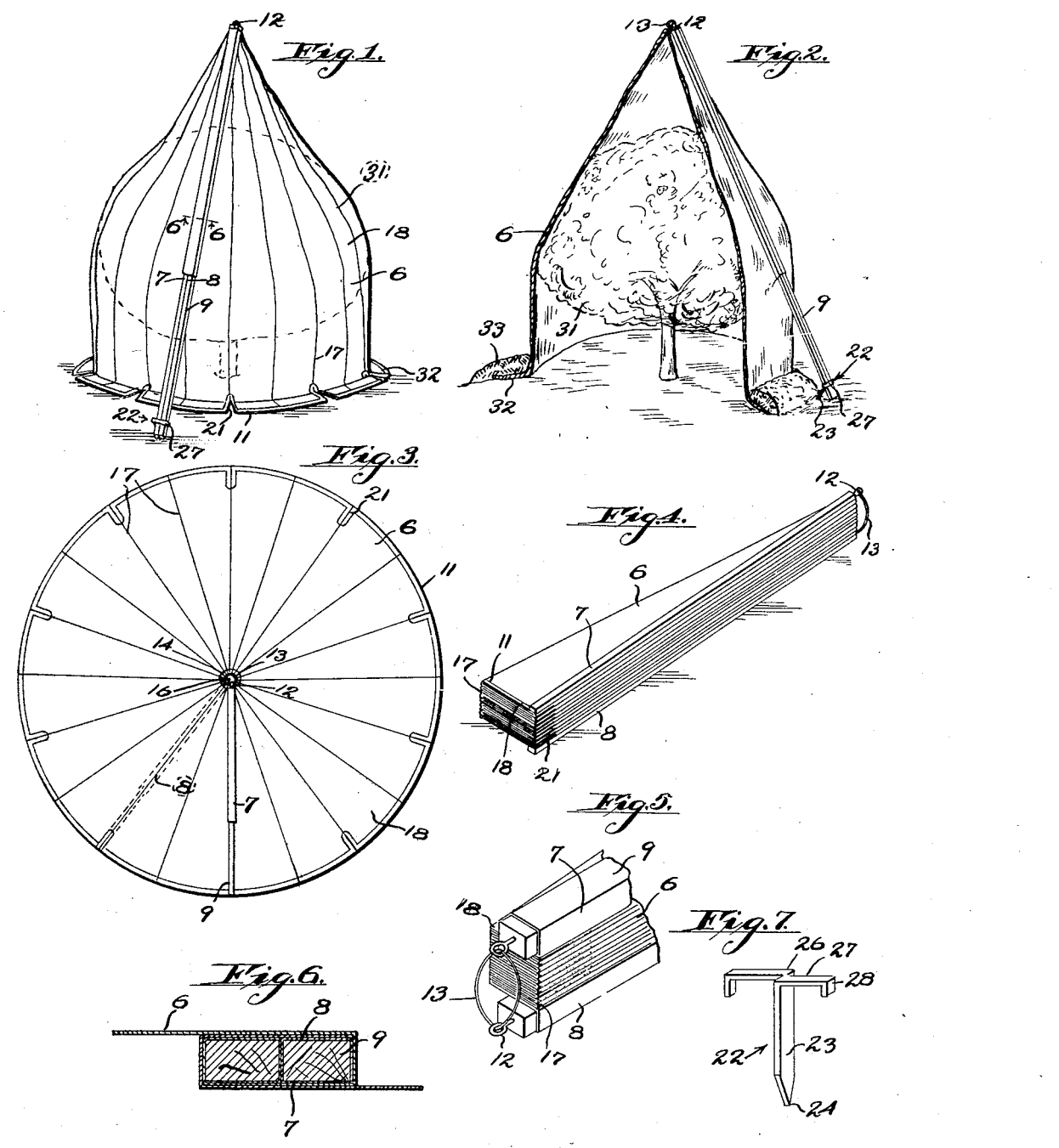

1,834,084

UNITED STATES PATENT OFFICE

CHARLES J. BARNES, OF REDLANDS, CALIFORNIA

TREE COVER

Application filed December 22, 1927. Serial No. 241,819.

This invention relates to tree covers, and has for an object the provision of an improved method of protecting sensitive trees and shrubs from the severity of the elements.

One of the specialized objects of the invention is to provide an improved method of protecting citrous trees from heat, frost and wind.

Another object is to provide a tree cover composed of flexible material, preferably a thermally-resistive fabric and having means for retaining the cover in position even when beset by relatively high winds.

A further object of the invention is the provision of a tree cover comprising a sheet of flexible material having staves secured to the ends thereof to facilitate placing the cover in position.

A still further object of the invention is the provision of a tree cover so formed of a relatively tough paper, and so reenforced that liability of tearing the paper is reduced to a minimum.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of the tree cover of my invention in operative position upon a tree which is shown in dashed lines.

Figure 2 is a perspective view of the cover and tree of Figure 1, a portion of the cover being broken away to better reveal the manner of positioning the cover upon the tree.

Fig. 3 is a plan view of the tree cover laid out flat to disclose the shape of the sheet of which the cover is made.

Fig. 4 is a perspective view of the cover after having been folded.

Fig. 5 is a perspective view of the upper end of the folded cover, enlarged to better reveal the manner of connecting the staves.

Fig. 6 is an enlarged, transverse, sectional view of the staves and a portion of the cover in operative position, the plane of section being indicated by the line 6—6 of Figure 1.

Fig. 7 is a perspective view of the anchoring pin used in connection with the tree cover of my invention.

I am aware that previous attempts have been made to protect citrous and other trees and shrubs from the damaging effects of wind and frost by methods other than the use of smudging and in which various types of tents, such as those used in the process of cyanide fumigation, have been employed as a covering for the trees, but within the scope of my knowledge I am the first to so devise a tree cover of wood pulp paper that it is low in manufacturing cost, easy to position upon the tree, efficacious in preventing the flow of heat to or from the tree and adapted to be so rigidly secured in position thereupon as to obviate liability of displacement by winds of even considerable force. The inherent advantage possessed by wood pulp paper is that it is much more nearly imperforate than are most woven fabrics, with the result that the paper is much more efficient as a heat insulator, making it highly desirable as a tree cover from the standpoint of heat retention as well as the inexpensiveness of manufacture. The only unfortunate feature connected with its use is its relatively low tensile strength which renders it liable to be easily torn; and this difficulty I have largely overcome by means of my improved manner of forming, reenforcing and folding the cover. However, it should be understood that I do not wish to be limited to the use of paper alone but that I may employ any suitable flexible material. In the present embodiment of my invention I am using this wood pulp paper because of the inherent qualities thereof which render it particularly adapted to my purpose.

The material of which the embodiment herein shown and described is made is a relatively tough wood pulp paper similar to that used in the building trades. The cover may consist of a single sheet or a plurality of sheets of such material substantially secured together, and is preferably sector-shaped, or circular in form with a radial split or slit permitting folding of the sheet into a plurality of sector shaped folds. For the purpose of supplying the necessary fullness to completely cover the tree it may be that the sheet will better serve its purpose if the circumference thereof describes more than a complete circle; as for example: the sheet of which the present embodiment is formed has a circumference of substantially 400°. Therefore, I wish it to be understood that in using the term circular I do not wish to be limited to a sheet having a circumference of exactly 360° but that I may be permitted to use a sheet of either more or less circumference as the requirements of the case shall dictate.

In accordance with the above understanding, the tree cover of my invention comprises a sector-shaped sheet 6 of relatively heavy wood pulp paper. As shown in Figure 3 the circular sheet is provided with a radial slit, and in order to provide the necessary fullness to adequately cover practically all shapes of trees within certain limits, the radial edges 7 and 8 defining the slit are preferably carried past one another so that the arc of the sector defined by the sheet 6 is substantially of 400°. A preferably wooden stave 9 is secured throughout a portion of its length to each of the edges 7 and 8 to facilitate placing the cover upon the tree or removal therefrom. For the purpose of reenforcing the cover I have found it advisable to incorporate a binding tape 11 therein by securing it along all of the edges of the sheet, both the circumferential edge and the radial edges where the staves 9 are attached thereto.

The staves 9 are secured together for universal movement in respect to each other by any convenient means such as by an eye 12 secured to the upper end of each stave 9 and a ring 13 engaged within both eyes. A central aperture 14 is also provided to facilitate operation of the cover and is suitably provided with binding tape 16 similar to binding tape 11.

The sheet 6 is preferably provided with alternately opposite radial creases 17 to enable the same to be folded into a plurality of sector shaped folds 18 as shown in Figure 4. When so folded one of each of the staves 9 is at each end of the folded cover. A plurality of radial splits or slits 21 extend inwards a short distance from the outer circumference of the sheet 6, there being a slit 21 at preferably each alternate fold 17.

In Figure 7 is shown a locking or anchoring pin 22 used in conjunction with my tree cover, and which is preferably made of a relatively thin sheet of metal. The pin comprises a body 23 which may be pointed at its lower end 24 and has a T-head 26 at its upper end which may be formed by splitting the body 23 downwards a short distance and bending the opposite edges on each side of the split in opposite directions to provide the horizontal portions 27, each of which is provided with a flange 28 bent downwards therefrom at its outer end.

In the operation of my device preferably two men can conveniently position the cover over a tree. One of the men will hold one of the staves 9, inclining the same so that its upper end is positioned substantially above the center of the tree 31. The other man then walks around the tree with the other stave 9, dropping the folds 18 as he does so upon the tree. If it should happen that an unusually long limb extends outward from the tree this second operator has only to raise his stave 9 over it as he walks therepast so that no difficulty is encountered in placing the cover upon the tree. After the second operator has completed his circuit of the tree the two staves 9 are placed together and twisted, rolling the edges 7 and 8 of the sheet 6 about the two staves, as clearly shown in Figure 6, to effectually close the aperture 14 in what has now become the upper end of the cover. It will be found that the cover shapes itself to the configuration of the tree and that the lower edge of the cover falls away therefrom to the ground. The slits 21 provided about the circumference of the sheet 6 permit that portion of the sheet which falls on to the ground to extend outwards therefrom as shown in Figures 1 and 2, in a plurality of horizontal flanges 32. If there is danger of wind arising or if for any other reason it should be deemed expedient, it is a matter of but a few minutes' work to shovel a small amount of earth 33 onto these flanges so as to securely retain the cover in position. Because of the fact that the staves 9 are secured to the edges 7 and 8 of the sheet 6 throughout a portion only of their length the lower edge of the cover will fall vertically from the tree throughout the entire circumference thereof, as shown upon Figure 2. Additional means for retaining the cover in place are provided by means of the locking or anchoring pin of Figure 7. Its method of application is to insert the body 23 of the pin between the staves 9 and drive or press the pin into the ground until the horizontal portions 27 and flanges 28 engage the staves 9 so as to prevent their unrolling. When so locked into position by the pin 22 and earth 33 piled upon the flanges 32 it has been proven by actual practice that the cover will not be displaced even when relatively high winds are encountered. The reason for this is that no entrance for the wind is provided and, of course, the cover can not be lifted from the tree if the wind can not get under the cover to exert such lifting action.

It will be understood that various changes in the details of construction may be made without departing from the spirit or scope of the invention as defined by the appended claims.

I claim:

1. A tree cover comprising a sector-shaped sheet of thermally-resistive material having radially disposed terminal edges, the arc of the sector described by said sheet being substantially a full circle, and means for securing said cover in substantially conical relation over a plant with said radial edges adjacent each other.

2. A tree cover comprising a sector-shaped sheet of thermally-resistive material, the arc of the sector described by said sheet being more than a full circle, and means for securing said cover in conical relation over a plant.

3. A tree cover comprising a circular sheet of paper having radial edges defining a radial slit adapted to be positioned in conical relation over a tree, and staves secured to the radial edges of said sheet for positioning the cover and retaining the same in place.

4. A tree cover comprising a sector-shaped sheet of thermally-resistive fibrous material having radially extending terminal edges, a stave secured to each radial edge of said sheet, said sheet being adapted to be optionally folded into a plurality of folds or extended to tree-covering relation, and the arc described by the periphery of said sheet being substantially a full circle, and means for securing said cover in substantially conical relation over a plant with said radial edges adjacent each other.

5. A tree cover comprising a circular sheet of thermally-resistive fibrous material having radial edges defining a radial slit and slits extending radially inward from the circumference thereof, staves secured throughout a portion of their length to said sheet along radial edges thereof, said staves being joined at the top for universal movement, said sheet being adapted to be optionally folded into a plurality of sector-shaped folds or extended to tree covering relation, and a locking pin comprising a rigid strip adapted to be driven into the ground between said staves, and a flanged T-head extending from the top of said strip to engage both staves so as to retain them in position.

6. A tree cover comprising a circular sheet of thermally-resistive fibrous material having slits extending radially inward from the circumference thereof and terminating in edges extending radially with respect to the circle defined by said sheet, and staves secured to said sheet along said radial edges thereof, said staves being joined at the top for universal movement.

7. A tree cover comprising a circular sheet of thermally-resistive fibrous material having radial edges defining a radial slit, staves secured throughout a portion of their length to said sheet along said radial edges, said staves being joined at the top for universal movement, said sheet being adapted to be optionally folded into a plurality of sector-shaped folds or extended to tree covering relation.

8. A tree cover comprising a circular sheet of thermally-resistive fibrous material having radial edges defining a radial slit, staves secured to said sheet along said radial edges, said staves being joined at the top for universal movement, and said sheet being adapted to be optionally folded into a plurality of sector-shaped folds or extended to tree covering relation.

9. A tree cover comprising a sector-shaped sheet of flexible material terminating in edges extending radially with respect to the sector defined by said sheet, and means for positioning said sheet over a tree, said positioning means comprising a stave secured to said sheet and extending along each of said radial edges.

10. A tree cover comprising a sector-shaped sheet of flexible material terminating in edges extending radially with respect to the sector defined by said sheet, means for positioning said sheet over a tree, said positioning means comprising a stave secured to said sheet and extending along each of said radial edges, and means pivotally interconnecting said staves at their upper ends.

11. A tree cover comprising a sector-shaped sheet of flexible material terminating in edges extending radially with respect to the sector defined by said sheet, means for positioning said sheet over a tree, said positioning means comprising a stave secured to said sheet and extending along each of said radial edges, and means interconnecting said staves at their upper ends for universal movement with respect to each other.

12. A tree cover comprising a sector-shaped sheet of flexible material having radially disposed terminal edges, and means for positioning said cover in substantially conical relation over a tree.

13. A tree cover comprising a sector-shaped sheet of flexible material having radially disposed terminal edges, means for positioning said cover in substantially conical relation over a tree, said positioning means comprising a stave secured to said sheet and extending along each of said radial edges, and a locking pin for retaining said sheet and staves in tree covering relation, comprising a rigid strip adapted to be driven into the ground between a pair of adjacent staves, and a flanged T-head extending from the top of said strip and engaging both of said staves to retain them in position.

In testimony whereof I have signed my name to this specification.

CHARLES J. BARNES.